US012649452B2

(12) United States Patent
Uchiyama et al.

(10) Patent No.: US 12,649,452 B2
(45) Date of Patent: Jun. 9, 2026

(54) STRADDLED VEHICLE

(71) Applicant: YAMAHA HATSUDOKI KABUSHIKI KAISHA, Iwata (JP)

(72) Inventors: Daisuke Uchiyama, Shizuoka (JP); Katsuya Haruta, Shizuoka (JP)

(73) Assignee: YAMAHA HATSUDOKI KABUSHIKI KAISHA, Iwata (JP)

( * ) Notice: Subject to any disclaimer, the term of this patent is extended or adjusted under 35 U.S.C. 154(b) by 579 days.

(21) Appl. No.: 18/088,308

(22) Filed: Dec. 23, 2022

(65) Prior Publication Data

US 2024/0001902 A1     Jan. 4, 2024

(30) Foreign Application Priority Data

Jun. 30, 2022     (JP) ................................. 2022-106373

(51) Int. Cl.
*B60T 17/04*          (2006.01)
*B62K 19/32*          (2006.01)

(52) U.S. Cl.
CPC .......... *B60T 17/046* (2013.01); *B60T 17/043* (2013.01); *B62K 19/32* (2013.01)

(58) Field of Classification Search
CPC ..... B60T 17/046; B60T 17/043; B62K 19/32; B62K 19/38
USPC ....................................................... 280/274
See application file for complete search history.

(56) References Cited

U.S. PATENT DOCUMENTS

| | | | | |
|---|---|---|---|---|
| 4,396,086 A | * | 8/1983 | Hattori ..................... | F01P 11/12 |
| | | | | 180/68.1 |
| 6,220,304 B1 | * | 4/2001 | Horiba .................. | B60T 17/043 |
| | | | | 138/146 |
| 6,446,996 B1 | * | 9/2002 | Horii ...................... | B62K 11/04 |
| | | | | 280/281.1 |
| 6,702,311 B2 | * | 3/2004 | Tsukiji ..................... | B62J 17/04 |
| | | | | 180/219 |
| 7,552,791 B2 | * | 6/2009 | Oohashi ................... | B62J 45/42 |
| | | | | 180/219 |
| 7,637,339 B2 | * | 12/2009 | Suzuki .................... | G09F 21/04 |
| | | | | 40/590 |
| 7,806,216 B2 | * | 10/2010 | Tokumura ............... | B60R 13/10 |
| | | | | 280/271 |

(Continued)

FOREIGN PATENT DOCUMENTS

JP          H08-332988 A     12/1996

*Primary Examiner* — Valentin Neacsu
*Assistant Examiner* — Michael R Stabley
(74) *Attorney, Agent, or Firm* — Rabin & Berdo, P.C.

(57)          ABSTRACT

A straddled vehicle includes a front wheel, a brake, a front fork, an upper bracket, a steering shaft, a cover, a connecting portion, a bolt, and a brake hose. The upper bracket is connected to the front fork. The steering shaft is connected to the upper bracket. The cover is disposed in front of the front fork. The connecting portion connects the cover and the upper bracket. The connecting portion includes a fixing portion and a linkage portion. The fixing portion is fixed to the upper bracket. The linkage portion is disposed between the cover and the fixing portion. The linkage portion is located below an upper surface of the upper bracket in an axial direction of the steering shaft. The bolt vertically passes through the fixing portion. The brake hose extends from the brake, through behind the cover, and through above the linkage portion.

13 Claims, 12 Drawing Sheets

(56)  References Cited

U.S. PATENT DOCUMENTS

| | | | |
|---|---|---|---|
| 8,196,946 B2 * | 6/2012 | Fuse ...................... | B62K 21/02 |
| | | | 280/124.179 |
| 8,424,626 B2 * | 4/2013 | Nomura .................. | B60K 6/40 |
| | | | 180/65.265 |
| 9,010,500 B2 * | 4/2015 | Uchida .................. | F16L 55/10 |
| | | | 188/24.11 |
| 9,187,049 B2 * | 11/2015 | Sugimoto .............. | B62J 45/423 |
| 9,346,413 B2 * | 5/2016 | Watanabe ................ | B62J 50/22 |
| 2006/0185944 A1 * | 8/2006 | Costa ................... | F16D 55/228 |
| | | | 188/73.1 |
| 2011/0121538 A1 * | 5/2011 | Giroux .................. | B62K 23/06 |
| | | | 280/280 |

* cited by examiner

STRADDLED VEHICLE

CROSS-REFERENCE TO RELATED APPLICATIONS

This application is based on, and claims priority from, Japanese Patent Application No. 2022-106373, filed on Jun. 30, 2022. The contents of the application is incorporated herein by reference.

FIELD

The present invention relates to a straddled vehicle.

BACKGROUND

Some straddled vehicles have a cover disposed in front of the front fork and include a connecting portion for attaching the cover to the upper bracket. For example, a motorcycle disclosed in Japanese Patent Application Publication No. H8-332988 has a number plate disposed in front of the front fork. The upper bracket is provided with a cylindrical mount projecting forward. A hole is provided in the number plate, and the number plate is fixed to the cylindrical mount by a bolt passed through the hole.

SUMMARY

In the connecting portion of the cover of Japanese Patent Application Publication No. H8-332988 described above, the cover is provided with the hole through which the bolt is passed. Therefore, the appearance of the cover is spoiled.

On the other hand, in some straddled vehicles, the brake hose extends behind the cover. The brake hose moves according to the expansion and contraction of the front fork. Therefore, in order to avoid interference with the connecting portion of the cover, the brake hose is disposed so as to pass over the connecting portion and be greatly bent upward. Therefore, the brake hose becomes long. The length of the brake hose affects the feel of the brake. Therefore, it is desirable that the length of the brake is short. An object of the present invention is to improve the appearance of a cover and shorten the length of a brake in a straddled vehicle.

A straddled vehicle according to one aspect of the present invention includes a front wheel, a brake, a front fork, an upper bracket, a steering shaft, a cover, a connecting portion, a bolt, and a brake hose. The brake is attached to the front wheel. The front fork rotatably supports the front wheel. The upper bracket is connected to the front fork. The steering shaft is connected to the upper bracket. The cover is disposed in front of the front fork. The connecting portion connects the cover and the upper bracket. The connecting portion includes a fixing portion and a linkage portion. The fixing portion is fixed to the upper bracket. The linkage portion is disposed between the cover and the fixing portion. The linkage portion is located below an upper surface of the upper bracket in an axial direction of the steering shaft. The bolt is vertically passed through the fixing portion. The brake hose extends from the brake, behind the cover, and above the linkage portion.

In the straddled vehicle according to the present aspect, the cover is attached to the upper bracket by passing the bolt through the fixing portion in the vertical direction. Therefore, the cover can be attached to the upper bracket without providing the cover with a hole for the bolt to pass through. This improves the appearance of the cover. Further, the linkage portion is located below the upper surface of the upper bracket in the axial direction of the steering shaft. Therefore, interference between the linkage portion and the brake hose extending above the linkage portion is suppressed. Thereby, the length of the brake hose can be shortened.

The linkage portion may be located at a center of the upper bracket in a left-right direction. In this case, the length of the brake hose can be shortened.

The linkage portion may have a shape recessed downward from the upper surface of the upper bracket. In this case, the position of the linkage portion can be lowered.

The fixing portion may be disposed on the upper surface of the upper bracket. In this case, it is easy to fix the fixing portion to the upper bracket.

The fixing portion may be located above the linkage portion. In this case, it is easy to fix the fixing portion to the upper bracket.

The linkage portion may extend rearward from the cover and have a shape bent upward toward the fixing portion. In this case, even if the position of the fixing portion is high, the position of the linkage portion can be lowered.

The upper bracket may include a first hole that opens upward. The fixing portion may include a second hole that opens upward. The bolt may be passed through the first hole and the second hole. In this case, the bolt is vertically passed through the fixing portion.

The cover may include a cover body and a guide. The guide may protrude rearward from a back surface of the cover body, extend vertically, and guide the brake hose. The upper surface of the linkage portion may be connected to the guide. In this case, the upper surface of the linkage portion functions together with the guide as a guide for the brake hose.

The cover may be a number plate. In this case, the appearance of the number plate is improved.

DESCRIPTION OF EMBODIMENTS

Figure 1:
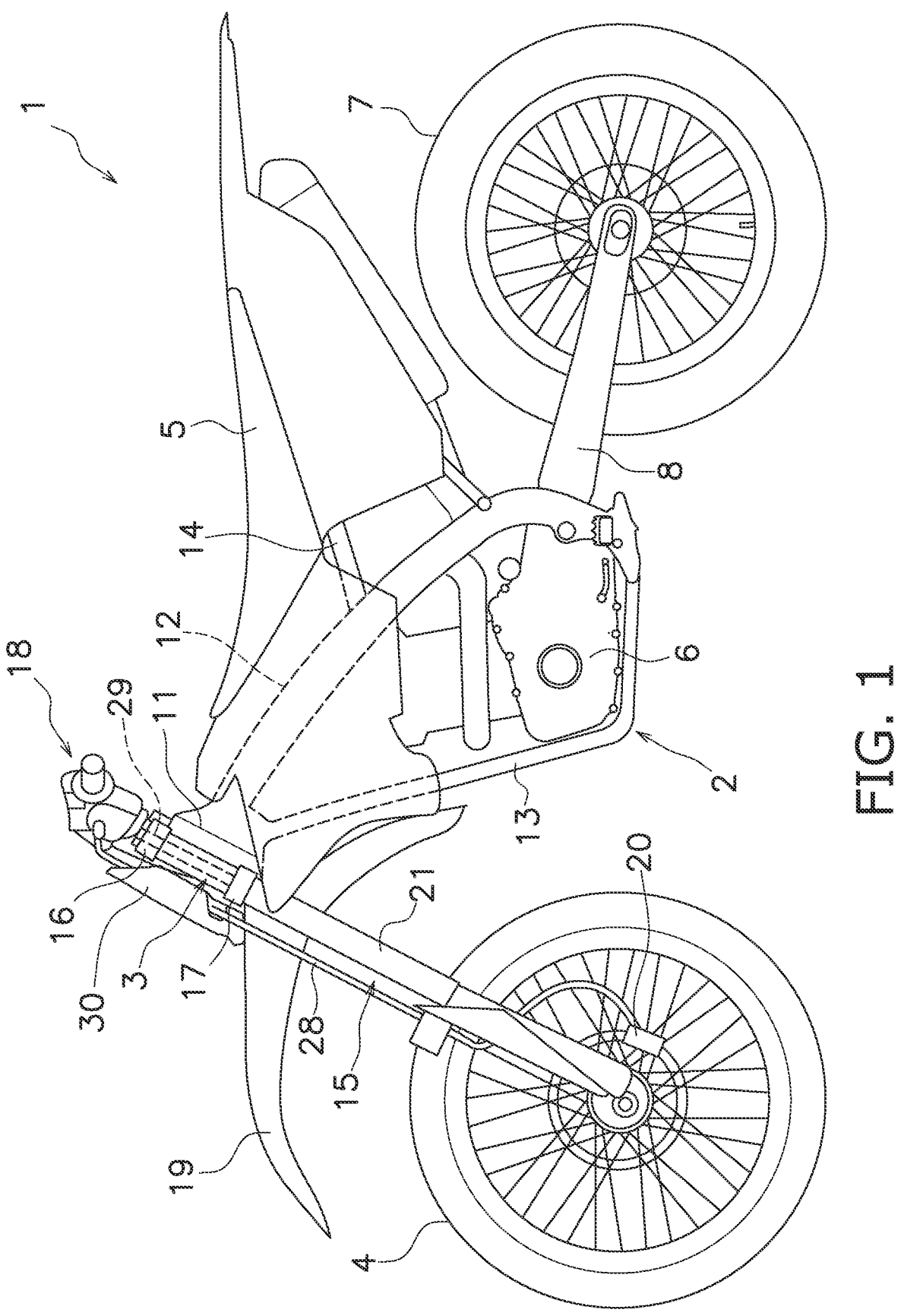
FIG. 1 is a side view of a straddled vehicle according to an embodiment.
Figure 2:
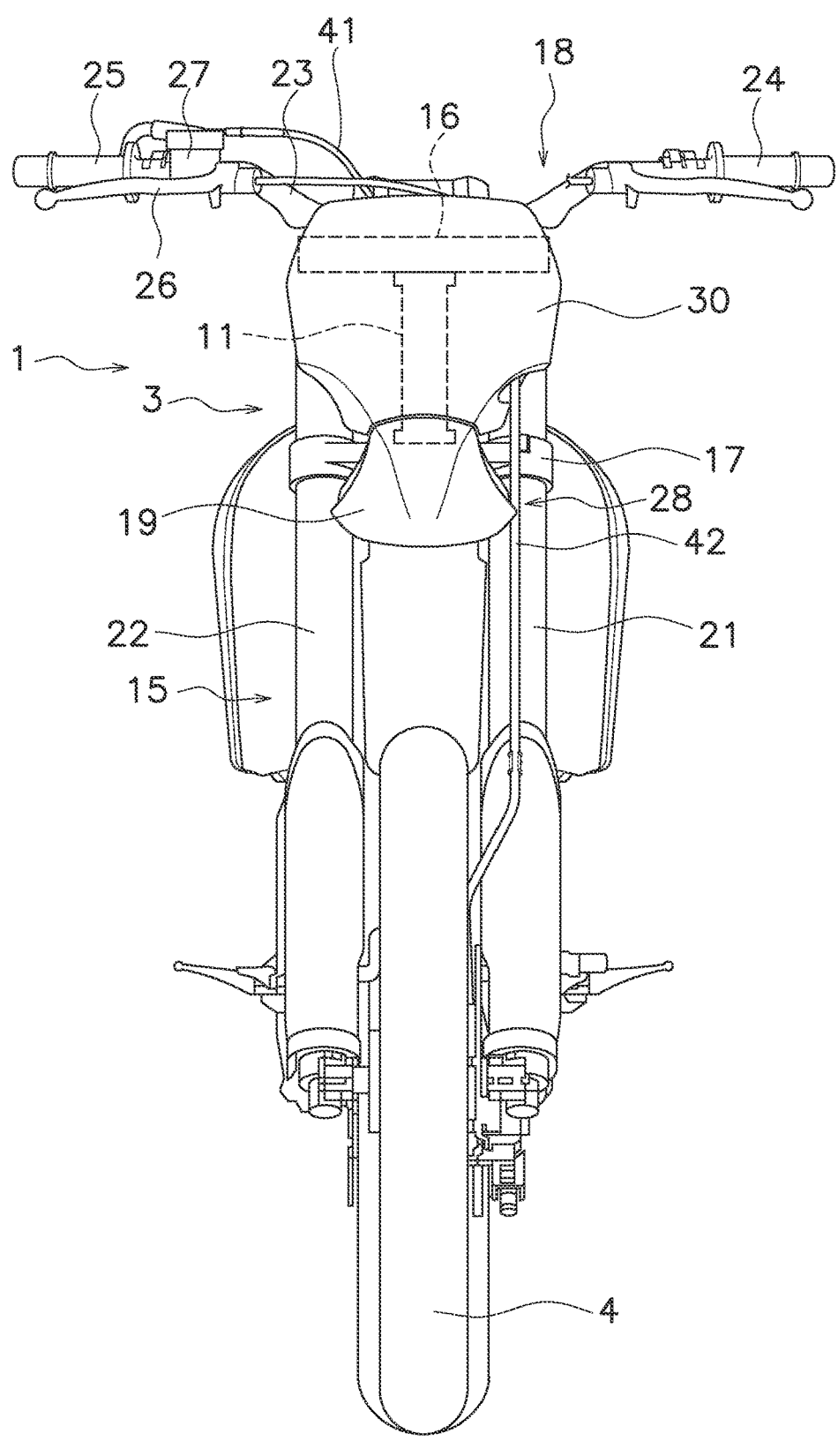
FIG. 2 is a front view of the straddled vehicle.

A straddled vehicle according to an embodiment will be described below with reference to the drawings. FIG. 1 is a side view of a straddled vehicle 1 according to an embodiment. FIG. 2 is a front view of the straddled vehicle 1. The straddled vehicle 1 is a so-called off-road type motorcycle. As shown in FIGS. 1 and 2, the straddled vehicle 1 includes a vehicle body frame 2, a steering device 3, a front wheel 4, a seat 5, a power unit 6, a rear wheel 7, and a swing arm 8. In this embodiment, the front, rear, left, and right directions refer to the front, rear, left, and right directions as seen from a rider seated on the seat 5.

The vehicle body frame 2 includes a head pipe 11, a first main frame 12, a second main frame 13, and a rear frame 14. The head pipe 11 extends forward and downward. The first main frame 12 is connected to the head pipe 11. The first main frame 12 extends from the head pipe 11 through behind the power unit 6. The first main frame 12 extends rearward and downward.

The second main frame 13 is connected to the head pipe 11. The second main frame 13 extends from the head pipe 11 through in front of the power unit 6. The rear frame 14 is connected to the first main frame 12. The rear frame 14 extends rearward and upward from the first main frame 12.

The steering device 3 is rotatably supported by the head pipe 11. The steering device 3 is configured to be steered by a rider. The steering device 3 includes a front fork 15, an upper bracket 16, a lower bracket 17, a handle member 18, and a steering shaft 29. The front fork 15 is rotatably supported by the head pipe 11. The front fork 15 includes a left suspension 21 and a right suspension 22. The front fork 15 rotatably supports the front wheel 4. A front brake 20 is attached to the front wheel 4. A front fender 19 is disposed above the front wheel 4.

The upper bracket 16 is connected to the left suspension 21 and the right suspension 22. The upper bracket 16 is disposed above the head pipe 11. The lower bracket 17 is disposed below the head pipe 11. The lower bracket 17 is connected to the left suspension 21 and the right suspension 22. The steering shaft 29 is inserted into the head pipe 11. The steering shaft 29 is connected to the upper bracket 16 and the lower bracket 17.

The handle member 18 is connected to the front fork 15 via the steering shaft 29. The handle member 18 is operable left and right by a rider. As shown in FIG. 2, the handle member 18 includes a handlebar 23, a left grip 24, and a right grip 25. The handlebar 23 is connected to the front fork 15 via the upper bracket 16. The left grip 24 is attached to the left end of the handlebar 23. The right grip 25 is attached to the right end of the handlebar 23.

A brake lever 26 and a master cylinder 27 are attached to the handle member 18. The brake lever 26 is disposed in front of the right grip 25. The master cylinder 27 is connected to the brake lever 26. The master cylinder 27 is disposed adjacent to the brake lever 26. A brake hose 28 connects the master cylinder 27 and the front brake 20. Hydraulic pressure for driving the front brake 20 is supplied from the master cylinder 27 to the front brake 20 through the brake hose 28 in response to the operation of the brake lever 26.

The seat 5 is disposed behind the head pipe 11. The seat 5 is supported by the vehicle body frame 2. The power unit 6 is disposed below the seat 5. The power unit 6 is supported by the first main frame 12 and the second main frame 13. The power unit 6 includes, for example, an internal combustion engine. Alternatively, the power unit 6 may include an electric motor.

The power unit 6 generates driving force for rotating the rear wheel 7. The rear wheel 7 is disposed behind the power unit 6. The rear wheel 7 is connected to the first main frame

12 via the swing arm 8. The swing arm 8 is swingably supported by the first main frame 12. The rear wheel 7 is rotatably supported by the swing arm 8.

The straddled vehicle 1 includes a cover 30. The cover 30 is a number plate. A number sticker used, for example, in an off-road motorcycle race is attached to the number plate. The cover 30 is made of resin, for example. However, the cover 30 may be made of metal such as aluminum. The cover 30 is disposed in front of the front fork 15. The cover 30 is attached to the upper bracket 16. The cover 30 rotates left and right together with the front fork 15. The cover 30 is disposed in front of the head pipe 11. As shown in FIG. 2, the cover 30 overlaps the head pipe 11 as seen in a vehicle front view. A lower end of the cover 30 is connected to the front fender 19.

Figure 3:
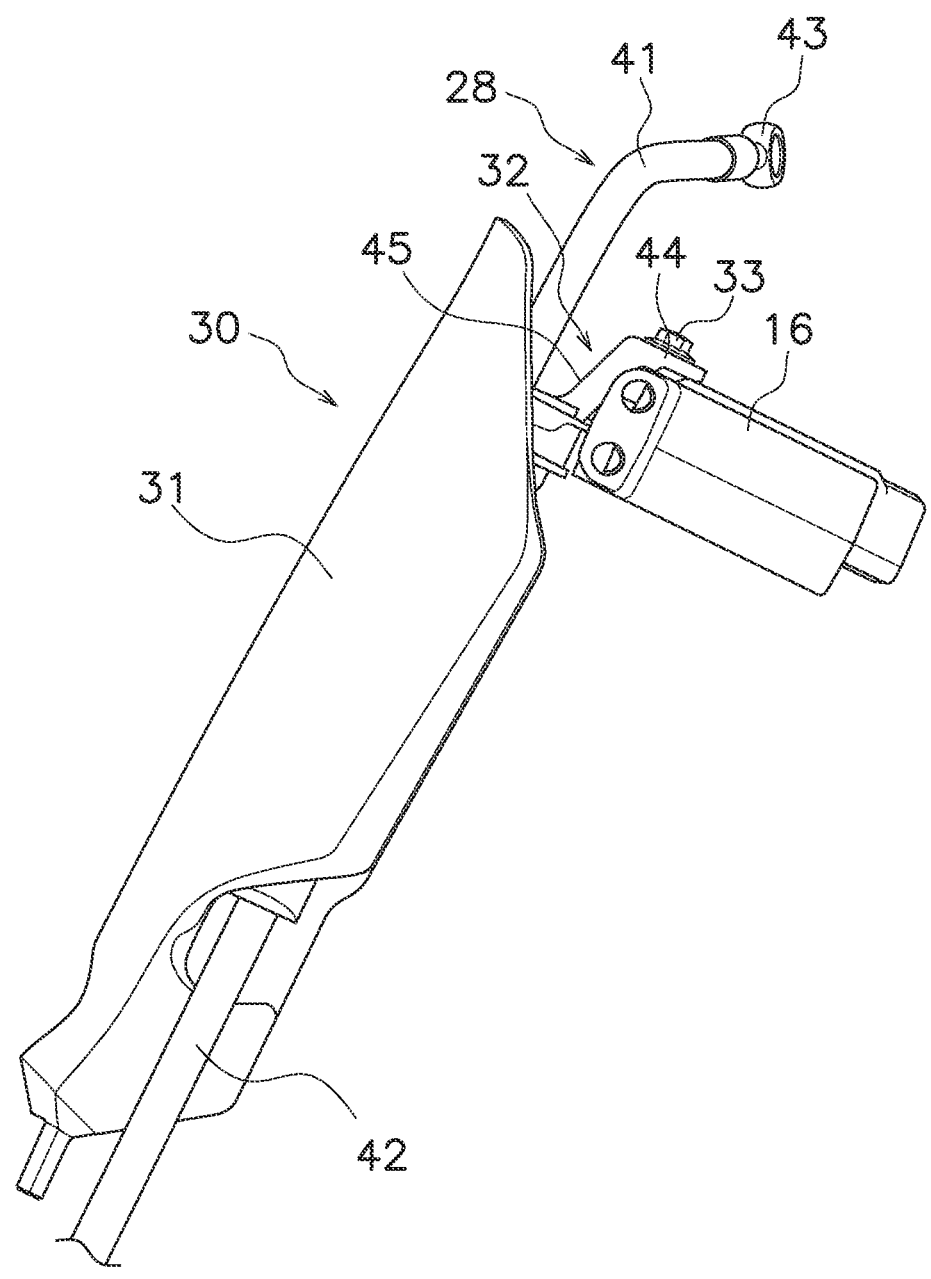
FIG. 3 is a side view showing a structure of a cover and its surroundings.
Figure 4:
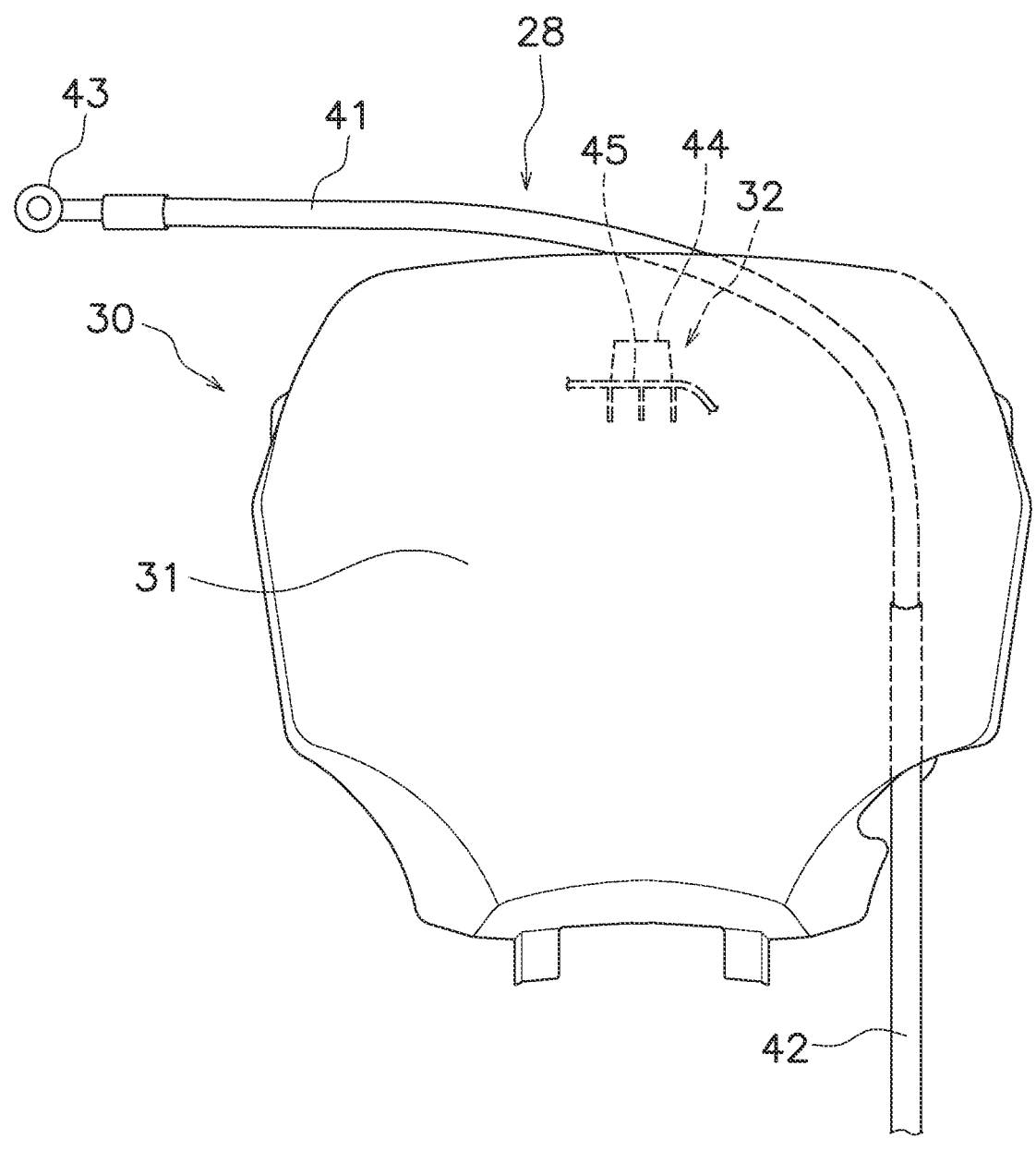
FIG. 4 is a front view showing the structure of the cover and its surroundings.
Figure 5:
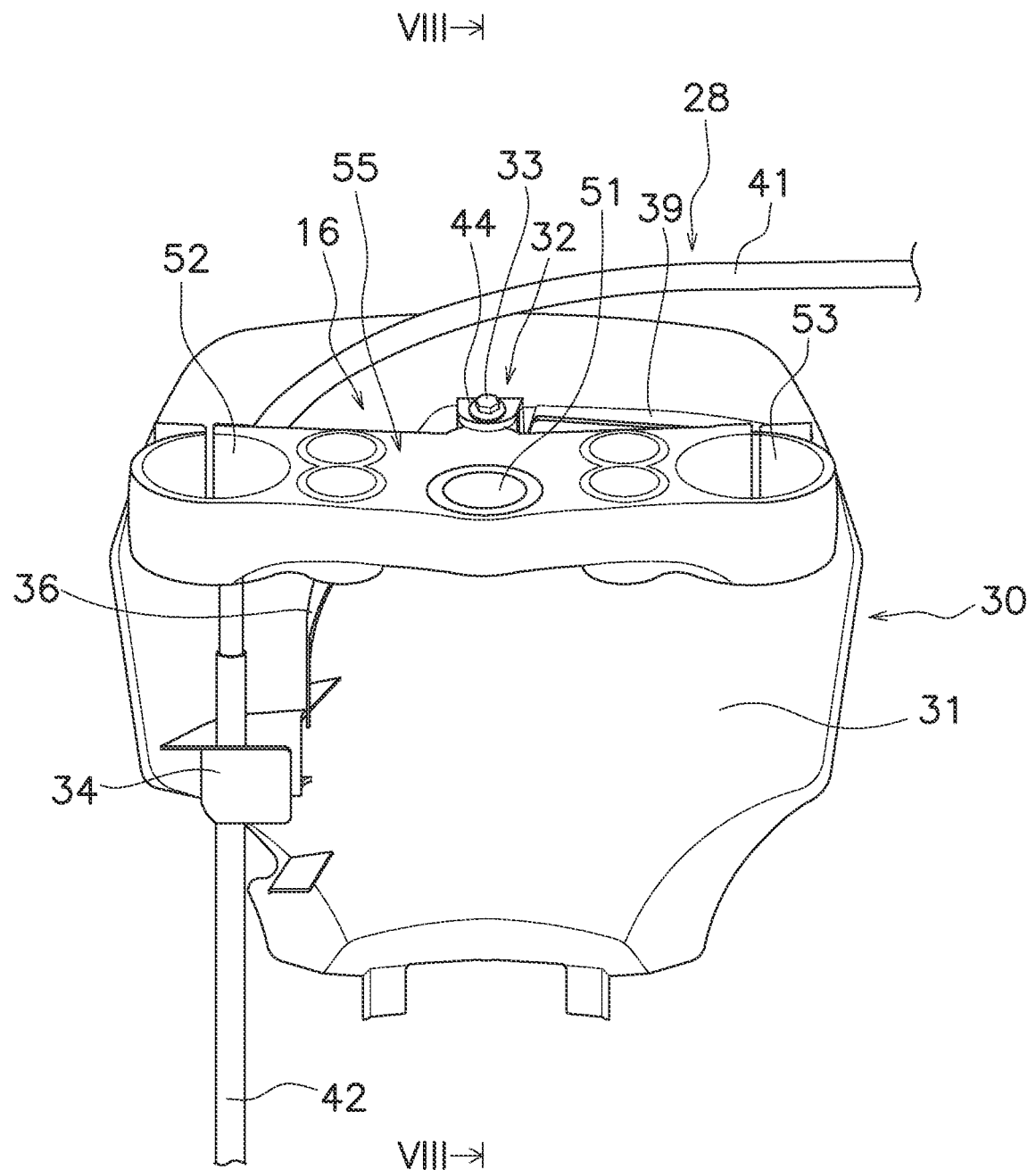
FIG. 5 is a rear view showing the structure of the cover and its surroundings.
Figure 6:
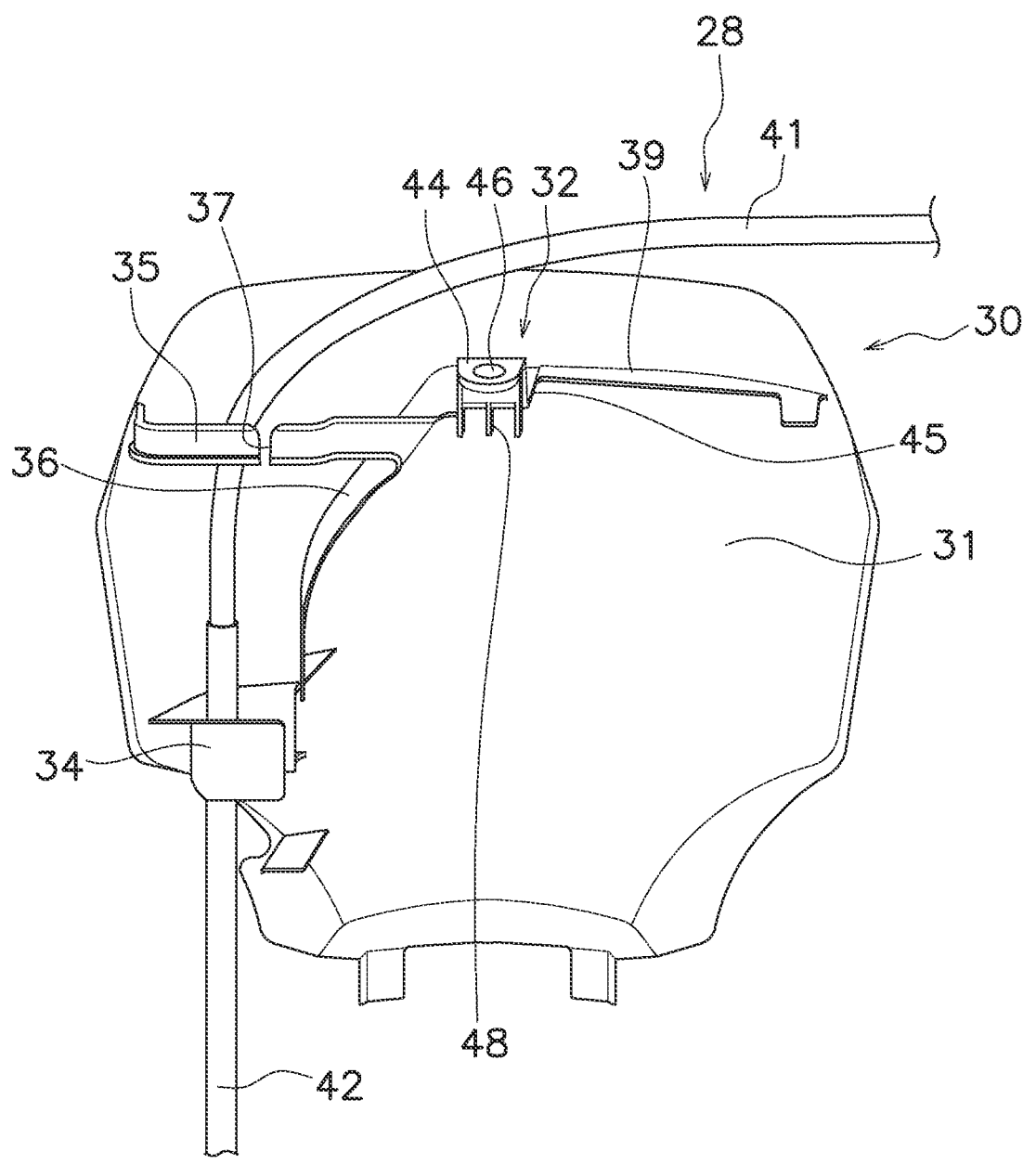
FIG. 6 is a rear view showing the structure of the cover and its surroundings.

FIG. 3 is a side view showing a structure of the cover 30 and its surroundings. FIG. 4 is a front view showing the structure of the cover 30 and its surroundings. FIG. 5 is a rear view showing the structure of the cover 30 and its surroundings. FIG. 6 is a diagram in which the upper bracket 16 is omitted from FIG. 5. As shown in FIGS. 3 to 6, the cover 30 includes a cover body 31. The cover body 31 has a curved plate-like shape. The number sticker is attached to the front surface of the cover body 31.

A connecting portion 32 is connected to the cover body 31. The connecting portion 32 extends rearward from the back surface of the cover body 31. The connecting portion 32 is attached to the upper bracket 16. The connecting portion 32 is fixed to the upper bracket 16 with a bolt 33. The connecting portion 32 is formed integrally with the cover 30. Alternatively, the connecting portion 32 may be provided separately from the cover 30.

The brake hose 28 extends through the rear of the cover 30 as shown in FIGS. 3 to 6. The brake hose 28 extends through between the cover 30 and the upper bracket 16. As seen in the vehicle rear view, the brake hose 28 extends leftward from a position above and rightward of the cover 30 through above the connecting portion 32. As seen in the vehicle rear view, the brake hose 28 is curved downward and extends downward on the left side of the connecting portion 32. As shown in FIG. 4, a part of the brake hose 28 overlaps the cover 30 as seen in the vehicle front view.

As shown in FIG. 6, the cover 30 includes a first guide 34, a second guide 35, and a third guide 36 for guiding the brake hose 28. The first guide 34, the second guide 35, and the third guide 36 are provided on the back surface of the cover body 31.

The first guide 34 has a U-shaped bent shape. The first guide 34 covers the front, rear, and outer lateral side of the brake hose 28. The inner lateral side of the first guide 34 is open. The second guide 35 is disposed above the first guide 34. The second guide 35 extends in the left-right direction. The second guide 35 covers the rear and outer lateral side of the brake hose 28. The width of the second guide 35 is larger than the width of the first guide 34 in the left-right direction. The second guide 35 includes a slit 37 extending vertically through the second guide 35. The width of slit 37 is smaller than the diameter of the brake hose 28.

The third guide 36 has a plate-like shape protruding rearward from the back surface of the cover body 31. The third guide 36 is disposed laterally inward of the brake hose 28. The third guide 36 is disposed between the connecting portion 32 and the first guide 34 in the left-right direction. The third guide 36 extends in the vertical direction. The third guide 36 has a shape curved upward and rightward. The third guide 36 is connected to the second guide 35. The third guide 36 is connected to the connecting portion 32. The cover 30 includes a rib 39. The rib 39 protrudes rearward from the back surface of the cover body 31. The rib 39 is disposed below the brake hose 28. The rib 39 extends in the left-right direction. The rib 39 is connected to the connecting portion 32. The rib 39 extends rightward from the connecting portion 32. The rib 39 improves the rigidity of cover 30.

The brake hose 28 bends according to the expansion and contraction of the front fork 15, thereby moving relative to the cover 30. The first to third guides 34 to 36 restrict movement of the brake hose 28. The first guide 34 restricts forward, rearward, and laterally outward movement of the brake hose 28. The second guide 35 restricts rearward and laterally outward movement of the brake hose 28. The third guide 36 restricts the laterally inward movement of the brake hose 28.

The brake hose 28 includes a first hose 41 and a second hose 42. The first hose 41 is a flexible hose. The first hose 41 is made of flexible resin. The first hose 41 is connected to the master cylinder 27 and the front brake 20.

As shown in FIGS. 3 and 4, a joint 43 is connected to one end of the first hose 41. The first hose 41 is connected to the master cylinder 27 via the joint 43. A joint (not shown) is connected to the other end of the first hose 41. The first hose 41 is connected to the front brake 20 via the joint. In addition, the first hose 41 may be integrated, or may include a plurality of hoses that are provided separately from each other and connected to each other.

The second hose 42 is provided separately from the first hose 41. The second hose 42 is attached to the first hose 41 so as to partially cover the first hose 41. The second hose 42 is made of resin that is harder than the first hose 41. The second hose 42 extends from behind the cover 30 to below the cover 30. As shown in FIG. 2, the second hose 42 extends downward along the left suspension 21 from behind the cover 30.

The first hose 41 is protected by the second hose 42. The first guide 34 described above guides the second hose 42. The first hose 41 is exposed to the outside above the second hose 42. The second guide 35 described above guides the first hose 41 above the second hose 42. The first hose 41 curves rightward above the second hose 42. A portion of the first hose 41 disposed above the second hose 42 is freely deformable according to the expansion and contraction of the front fork 15.

Figure 7:
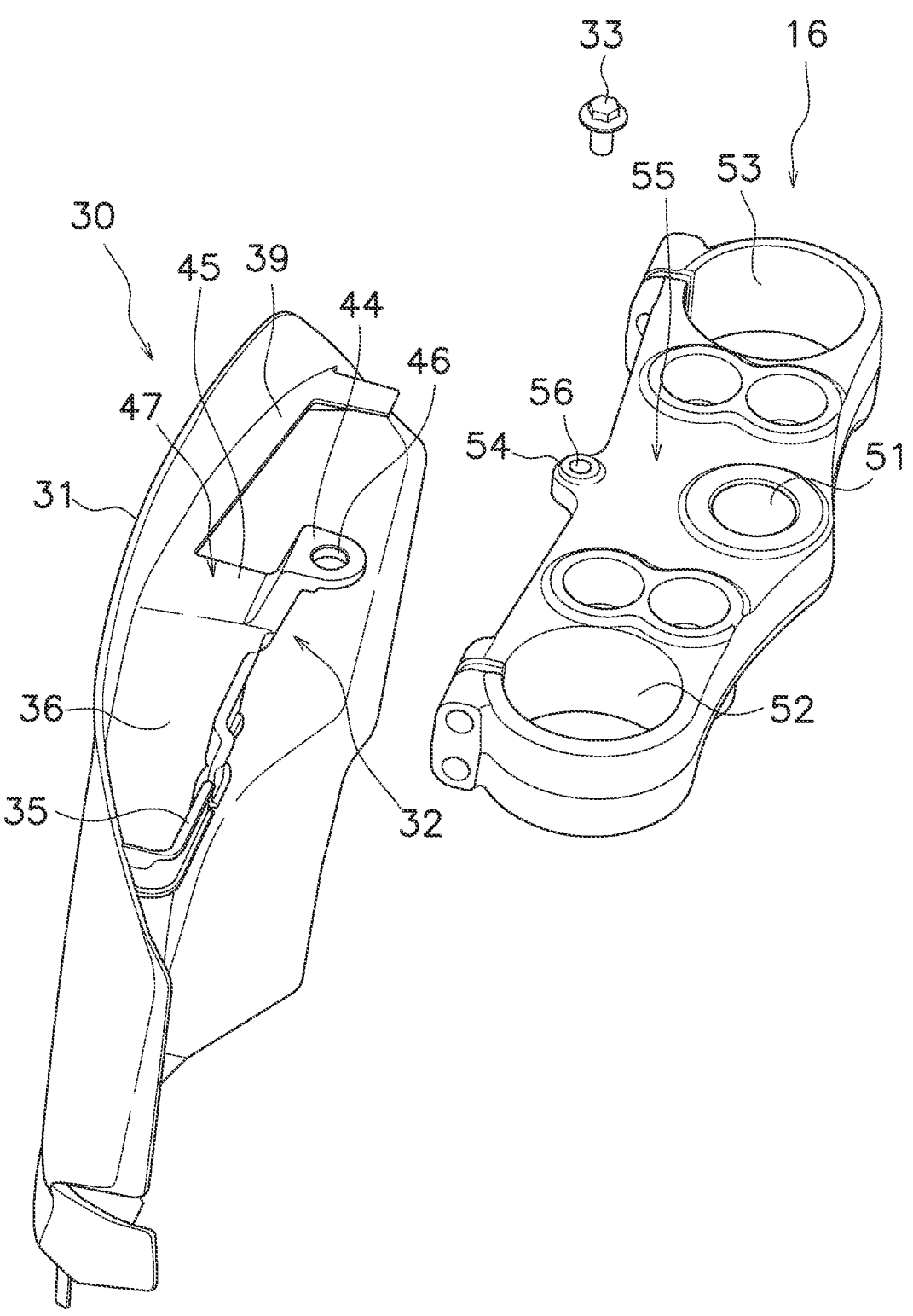
FIG. 7 is an exploded perspective view of the cover and an upper bracket.
Figure 8:
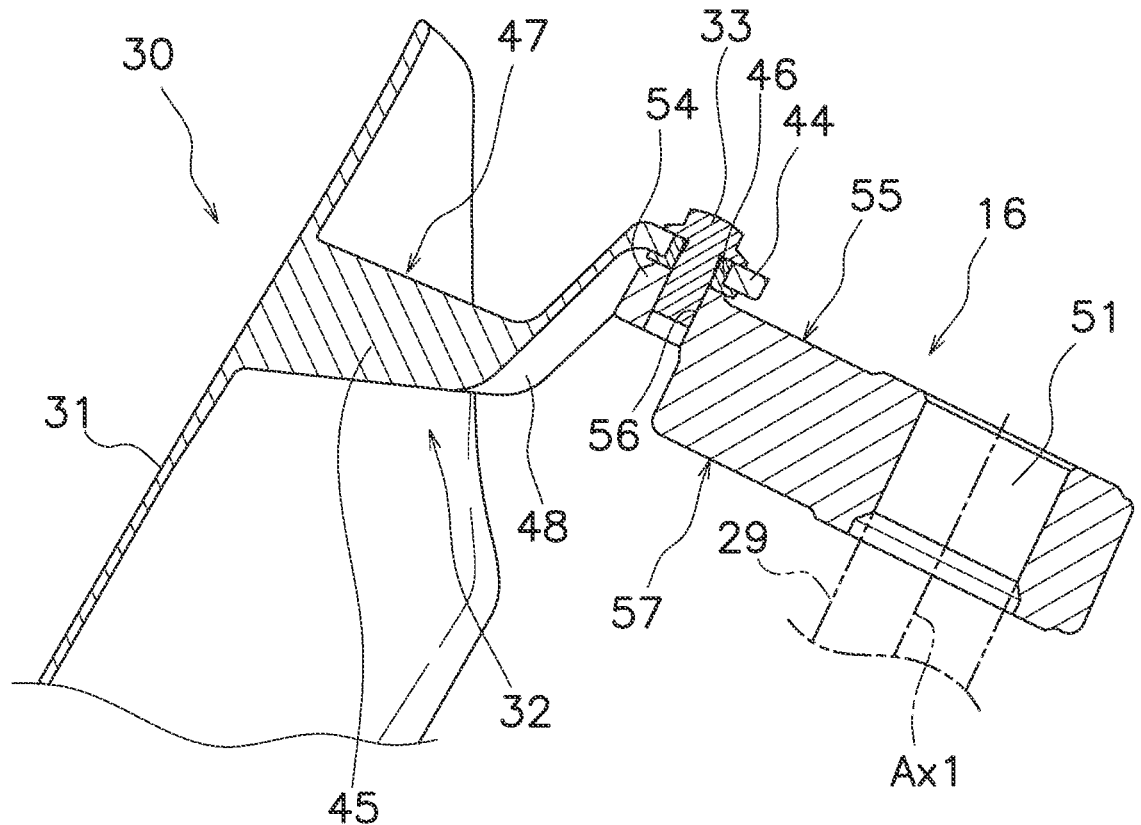
FIG. 8 is a cross-sectional view taken along line VIII-VIII in FIG. 5.

FIG. 7 is an exploded perspective view of the cover 30 and the upper bracket 16. FIG. 8 is a cross-sectional view taken along line VIII-VIII in FIG. 5. As shown in FIG. 7, the upper bracket 16 extends in the left-right direction. The upper bracket 16 includes a steering shaft hole 51, a left suspension hole 52, and a right suspension hole 53.

As shown in FIG. 8, the steering shaft hole 51 extends through the upper bracket 16 in an axial direction of the steering shaft 29 (hereinafter referred to as "steering axial direction") Ax1. The steering shaft 29 is passed through the steering shaft hole 51. The left suspension hole 52 extends through the upper bracket 16 in the steering axis direction Ax1. The left suspension 21 is passed through the left suspension hole 52. The right suspension hole 53 extends through the upper bracket 16 in the steering axis direction Ax1. The right suspension 22 is passed through the right suspension hole 53.

The upper bracket 16 includes a first fixing portion 54. The first fixing portion 54 is provided on the upper surface 55 of the upper bracket 16. The connecting portion 32 is fixed to the first fixing portion 54. The cover 30 is thereby fixed to the upper bracket 16.

As shown in FIGS. 7 and 8, the connecting portion 32 includes a second fixing portion 44 and a linkage portion 45. As shown in FIG. 8, the second fixing portion 44 is located higher than the linkage portion 45 in the steering axis direction Ax1. The second fixing portion 44 is disposed on the upper surface 55 of the upper bracket 16. The second fixing portion 44 is disposed above the first fixing portion 54 of the upper bracket 16. The second fixing portion 44 is fixed to the first fixing portion 54.

The first fixing portion 54 includes a first hole 56. The first hole 56 extends vertically through the first fixing portion 54. The first hole 56 opens upward. The second fixing portion 44 includes a second hole 46. The second hole 46 extends vertically through the second fixing portion 44. The second hole 46 opens upward. The bolt 33 is passed through the first hole 56 and the second hole 46. The bolt 33 is passed through the first fixing portion 54 and the second fixing portion 44 from above.

The linkage portion 45 is disposed between the cover 30 and the second fixing portion 44. The linkage portion 45 is connected to the rear surface of the cover body 31. The linkage portion 45 is connected to the second fixing portion 44. The linkage portion extends rearward from the cover body 31 and has a shape bent upward toward the second fixing portion 44. The upper surface 47 of the linkage portion 45 has a shape recessed downward from the upper surface 55 of the upper bracket 16. The linkage portion 45 is located below the upper surface 55 of the upper bracket 16 in the steering axis direction Ax1. As shown in FIG. 4, the linkage portion 45 is located at the center of the upper bracket 16 in the left-right direction. The first hose 41 extends over the linkage portion 45.

A rib 48 is provided on the bottom surface of the linkage portion 45. The rib 48 protrudes from the bottom surface of the linkage portion 45. The rib 48 extends in the front-rear direction. As shown in FIG. 6, the upper surface 47 of the linkage portion 45 is connected to the third guide 36. The third guide 36 extends leftward and downward from the upper surface 47 of the linkage portion 45. The upper surface 47 of the linkage portion 45 is connected to the rib 39. The rib 39 extends rightward from the upper surface 47 of the linkage portion 45.

In the straddled vehicle 1 according to the present embodiment described above, the cover 30 is attached to the upper bracket 16 by passing the bolt 33 vertically through the first fixing portion 54 and the second fixing portion 44. Therefore, the cover 30 can be attached to the upper bracket 16 without providing the cover 30 with a hole for the bolt 33 to pass through. Thereby, the appearance of the cover 30 is improved. Further, the linkage portion 45 is located below the upper surface 55 of the upper bracket 16 in the steering axis direction Ax1. Therefore, interference between the brake hose 28 passing above the linkage portion 45 and the linkage portion 45 is suppressed. Thereby, the length of the brake hose 28 can be shortened.

Although one embodiment of the present invention has been described above, the present invention is not limited to the above-described embodiment, and various modifications are possible without departing from the gist of the invention.

The straddled vehicle 1 is not limited to the off-road type, and may be other types of vehicles such as a street type or a moped. The cover 30 is not limited to the number plate, and may be another cover such as a headlight cowl. The shape of the cover 30 is not limited to that of the above embodiment, and may be changed. For example, the positions of the first through third guides 34 to 36 may be changed. The first through third guides 34 to 36 may be omitted.

Figure 9:
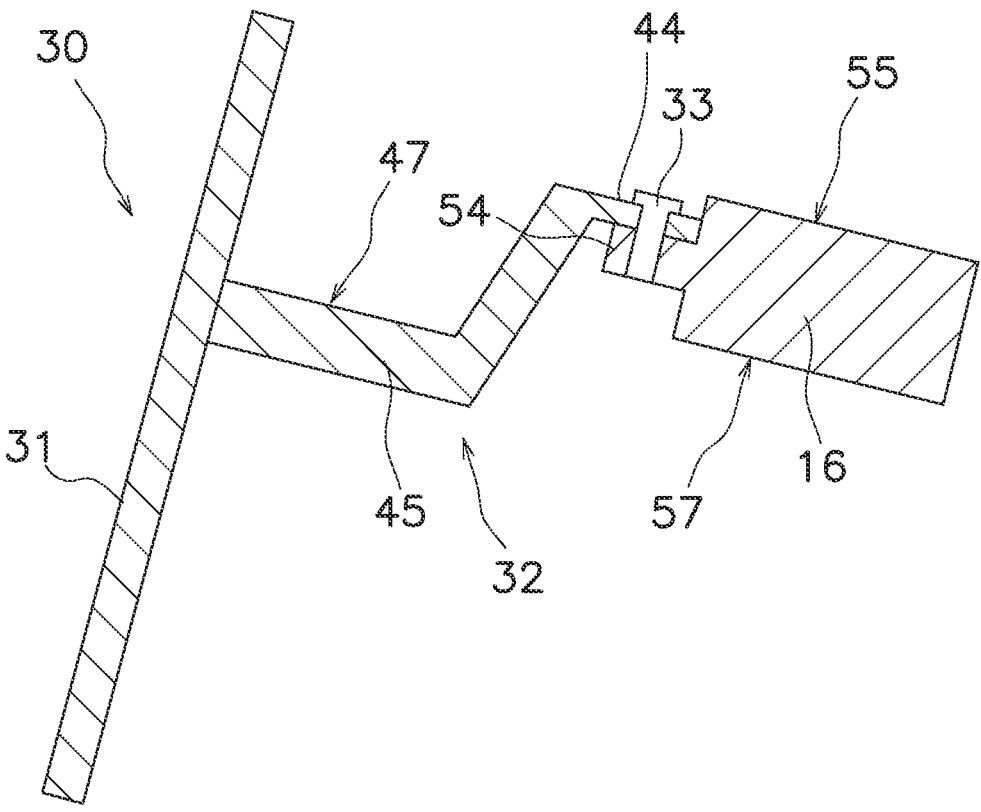
FIG. 9 is a schematic diagram of the upper bracket, the cover, and a connecting portion according to a first modification.
Figure 10:
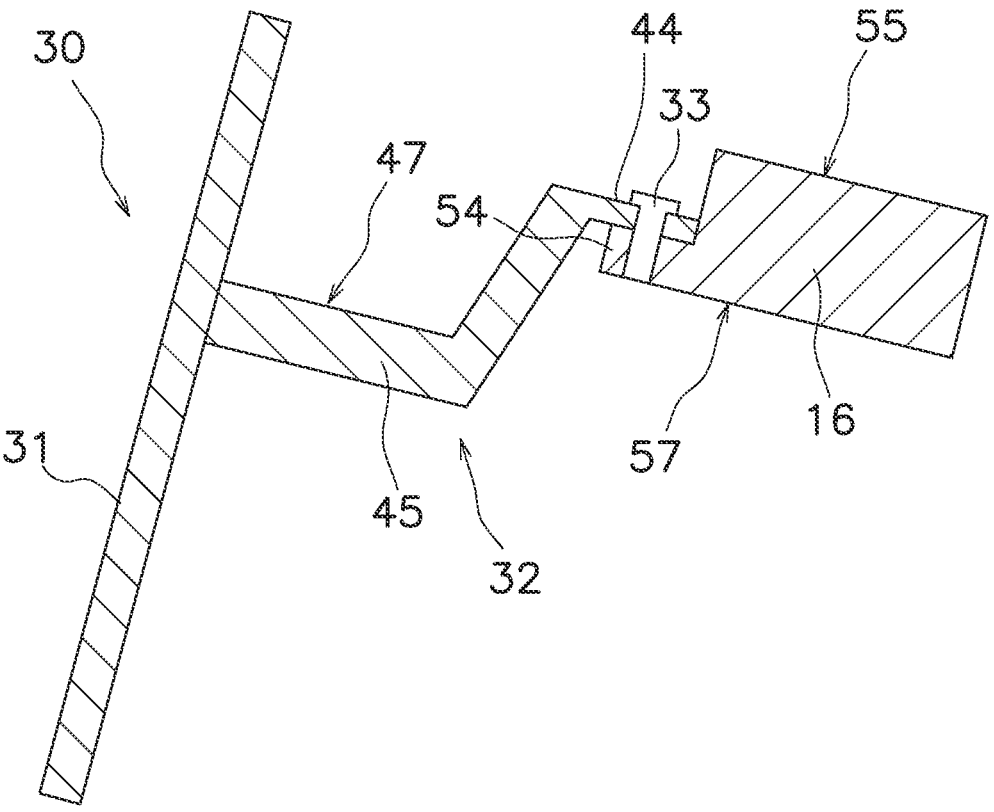
FIG. 10 is a schematic diagram of the upper bracket, the cover, and the connecting portion according to a second modification.

The first fixing portion 54 may be located in other positions, not limited to the upper surface 55 of the upper bracket 16. For example, FIG. 9 is a schematic diagram of the upper bracket 16, the cover 30, and the connecting portion 32 according to a first modification. As shown in FIG. 9, the first fixing portion 54 may be disposed below the upper surface 55 of the upper bracket 16 and above the bottom surface 57. Alternatively, FIG. 10 is a schematic diagram of the upper bracket 16, the cover 30, and the connecting portion 32 according to a second modification. As shown in FIG. 10, the first fixing portion 54 may be provided on the bottom surface 57 of the upper bracket 16.

Figure 11:
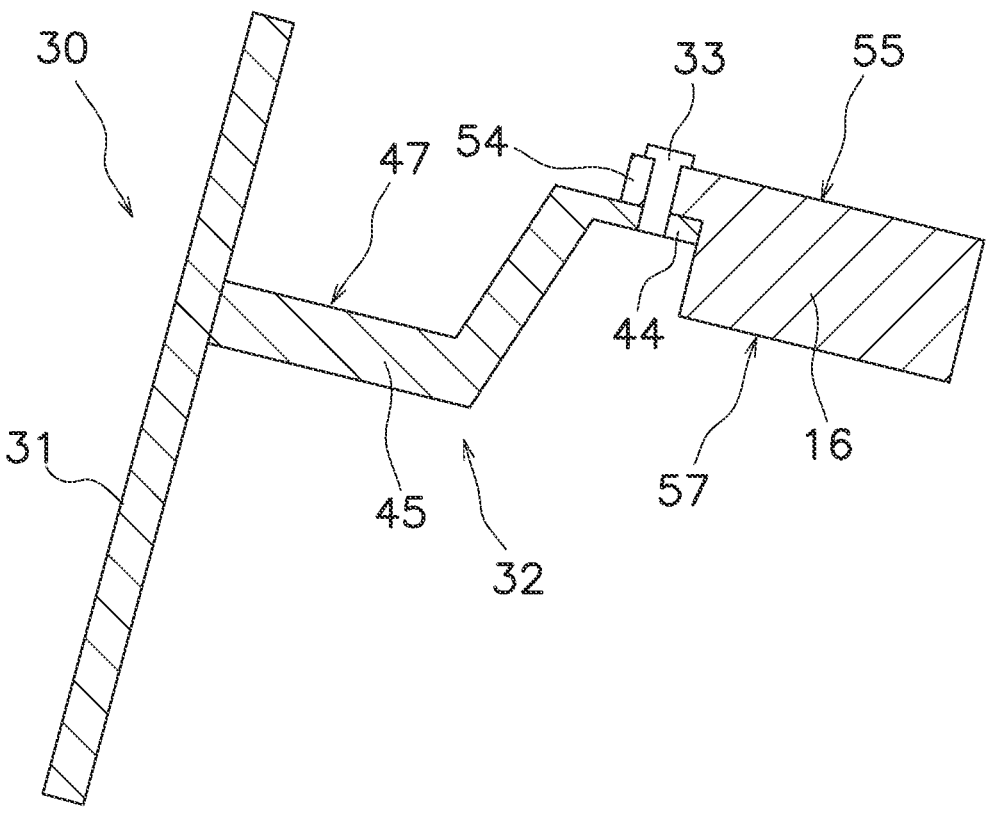
FIG. 11 is a schematic diagram of the upper bracket, the cover, and the connecting portion according to a third modification.

The configuration of the connecting portion 32 is not limited to that of the above embodiment, and may be changed. For example, FIG. 11 is a schematic diagram of the upper bracket 16, the cover 30, and the connecting portion 32 according to a third modification. As shown in FIG. 11, the second fixing portion 44 may be disposed below the first fixing portion 54. Similarly in the modifications described above, the second fixing portion 44 may be disposed below the first fixing portion 54.

Figure 12:
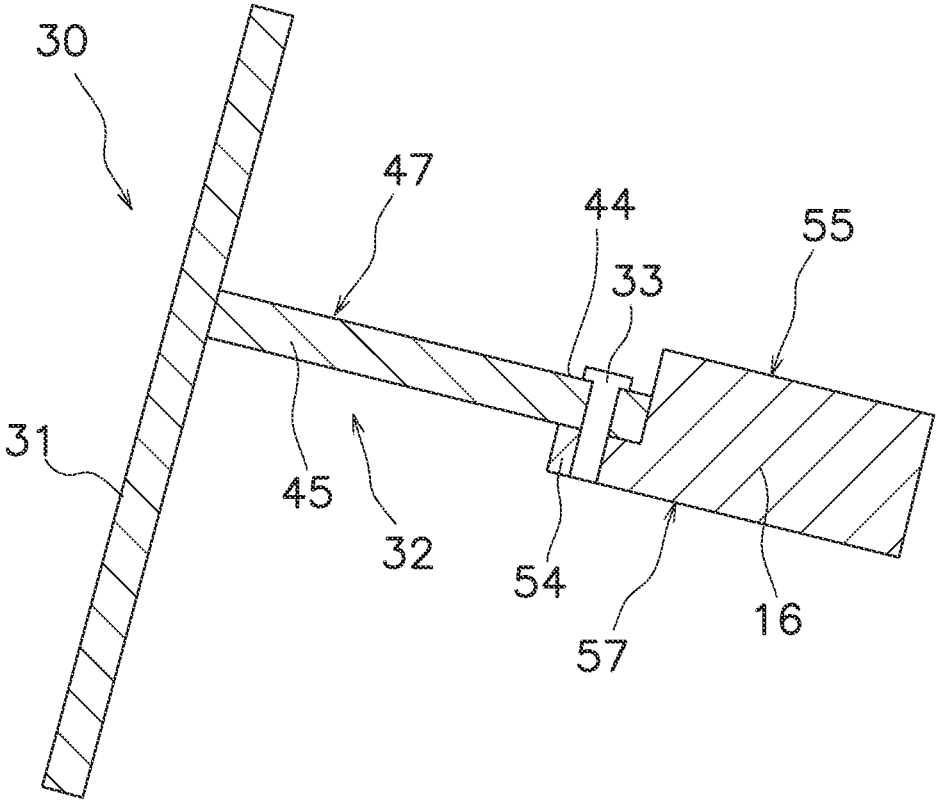
FIG. 12 is a schematic diagram of the upper bracket, the cover, and the connecting portion according to a fourth modification.

The shape of the linkage portion 45 is not limited to that of the above embodiment, and may be changed. For example, FIG. 12 is a schematic diagram of the upper bracket 16, the cover 30, and the connecting portion 32 according to a fourth modification. As shown in FIG. 12, the linkage portion 45 may be linear. Similarly, in the modifications described above, the linkage portion 45 may be linear.

In the above embodiment, the bolt 33 is passed through the first fixing portion 54 and the second fixing portion 44 from above. However, the bolt 33 may pass through the first fixing portion 54 and the second fixing portion 44 from below.

REFERENCE SIGNS LIST

4: Front wheel, 15: Front fork, 16: Upper bracket, 20: Front brake, 28: Brake hose, 29: Steering shaft, 30: Cover, 31: Cover body, 32: Connecting portion, 33: Bolt, 44: Second fixing portion, 45: Linkage portion, 46: Second hole, 56: First hole

The invention claimed is:

1. A straddled vehicle comprising:
a front wheel;
a brake attached to the front wheel;
a front fork that rotatably supports the front wheel;
an upper bracket connected to the front fork;
a steering shaft connected to the upper bracket;
a cover disposed in front of the front fork;
a connecting portion connecting the cover and the upper bracket, the connecting portion including
a fixing portion fixed to the upper bracket, and
a linkage portion disposed between the cover and the fixing portion, the linkage portion being located below an upper surface of the upper bracket in an axial direction of the steering shaft;
a bolt passing through the fixing portion in the axial direction of the steering shaft;
a brake hose extending upward from the brake, with respect to the axial direction of the steering shaft, behind the cover, to pass over the linkage portion; and a first guide, a second guide, and a third guide provided on a back surface of the cover to restrict movement of the brake hose, wherein
the linkage portion has a shape recessed downward, with respect to the axial direction of the steering shaft, from the upper surface of the upper bracket;
the first guide restricts forward, rearward, and laterally outward movement of the brake hose;
the second guide restricts rearward and laterally outward movement of the brake hose; and
the third guide restricts laterally inward movement of the brake hose.

2. The straddled vehicle according to claim 1, wherein the linkage portion is located at a center of the upper bracket in a left-right direction of the straddled vehicle.

3. The straddled vehicle according to claim 1, wherein the fixing portion is disposed on the upper surface of the upper bracket.

4. The straddled vehicle according to claim 1, wherein, with respect to the axial direction of the steering shaft,
the fixing portion is located above the linkage portion, and
the linkage portion extends rearward from the cover and has a shape bent upward toward the fixing portion.

5. The straddled vehicle according to claim 1, wherein, with respect to the axial direction of the steering shaft,
the upper bracket includes a first hole that opens upward,
the fixing portion includes a second hole formed therein, and
the bolt passes through the second hole to be fixed in the first hole.

6. The straddled vehicle according to claim 1, wherein the cover includes
a cover body, and
a guide that projects rearward from a back surface of the cover body, for guiding the brake hose, and
an upper surface of the linkage portion is connected to the guide.

7. The straddled vehicle according to claim 1, wherein the cover is a number plate.

8. The straddled vehicle according to claim 1, wherein the first guide has a U-shaped bent shape, and covers front, rear, and outer lateral sides of the brake hose.

9. The straddled vehicle according to claim 1, wherein the second guide extends in the left-right direction, and covers rear and outer lateral sides of the brake hose.

10. The straddled vehicle according to claim 1, wherein a width of the second guide is larger than a width of the first guide in a left-right direction of the straddled vehicle.

11. The straddled vehicle according to claim 1, wherein the second guide includes a slit extending vertically through the second guide, a width of slit beings smaller than a diameter of the brake hose.

12. The straddled vehicle according to claim 1, wherein the third guide has a plate-like shape protruding rearward from the back surface of the cover, and is disposed laterally inward of the brake hose.

13. The straddled vehicle according to claim 1, wherein the third guide is disposed between the connecting portion and the first guide in a left-right direction of the straddled vehicle, and extends in a vertical direction.

* * * * *